May 21, 1957
W. S. JENNETTE
2,792,660
FISHING ROD TIP
Filed July 22, 1955
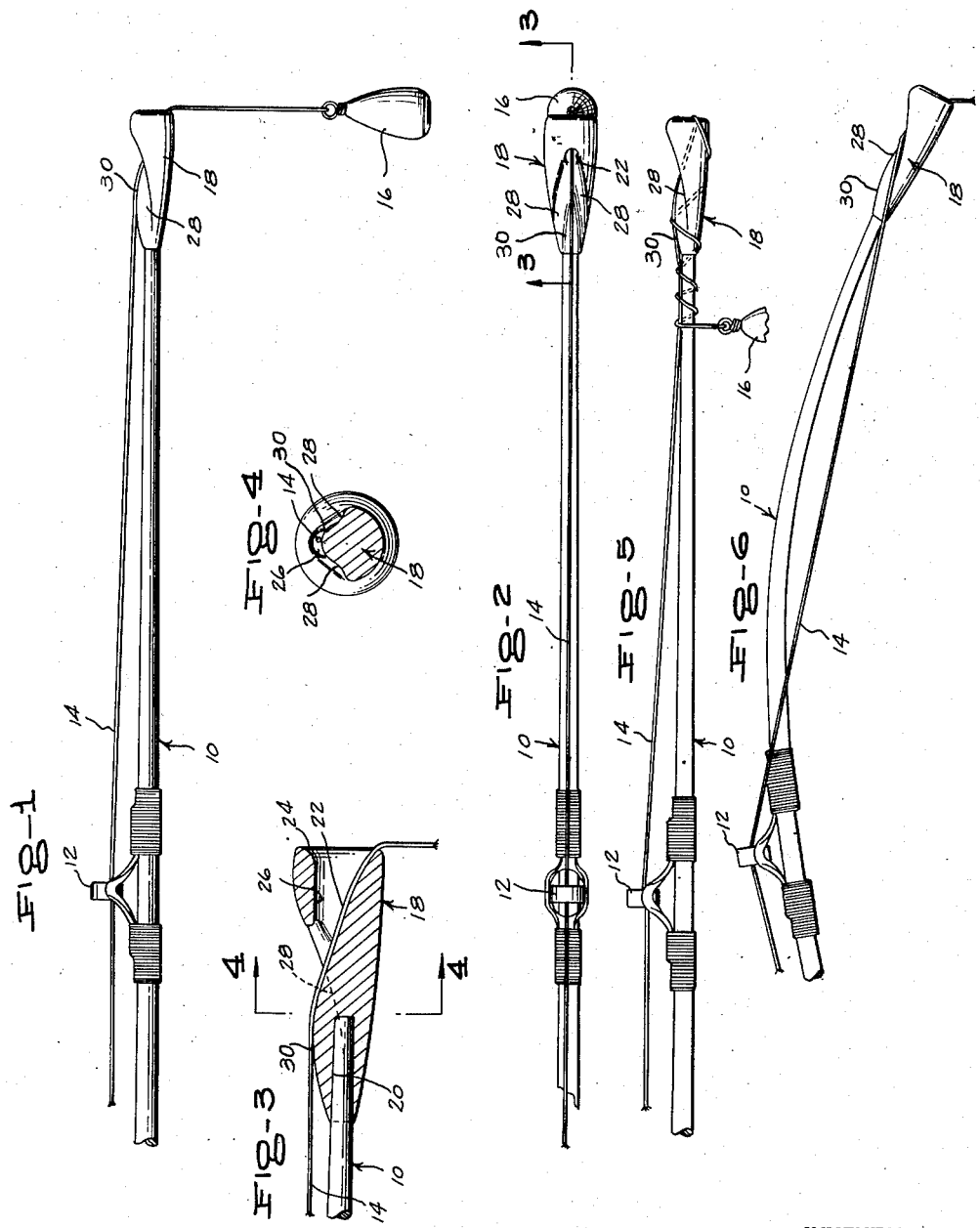
INVENTOR.
WILLIAM S. JENNETTE
BY
McMorrow, Berman + Davidson
ATTORNEYS

United States Patent Office 2,792,660
Patented May 21, 1957

2,792,660

FISHING ROD TIP

William S. Jennette, Elizabeth City, N. C.

Application July 22, 1955, Serial No. 523,819

5 Claims. (Cl. 43—24)

This invention relates to a tip for a fishing rod, comprising an end or tip guide for a line carried by said rod, which tip will be so designed as to measurably reduce the possibility of entanglement of the line with the rod at the location of the tip, and will further provide more efficient performance during casting or reeling in of the line.

Ordinarily, when casting, the fisherman must exercise great care, due to the tendency of the line to become entangled with the rod tip, and it is well known that under these circumstances, the line may become wound about the end of the rod, causing back lashes, incomplete casts, loss of bait due to line breakage, and the breakage of the tip itself or the pulling of the tip off the end of the rod.

The main object of the present invention, in view of the difficulties which have heretofore persisted, is to provide a generally improved rod tip so designed as to eliminate the deficiencies of conventional tips, by eliminating or at least measurably reducing the possibility of line entanglement, while at the same time facilitating the smooth paying out or reeling in of the line through the tip during regular use of the rod.

Another object of importance is to provide a device as stated which will be so shaped that when a line does become wound about the rod adjacent the tip, the line can be unwound or untangled with ease, by simply pulling on the line at any location along the length of the rod, the shape of the tip being such that the line will slip off the rod tip, responsive either to said pull by the user, or, alternatively, responsive to holding of the rod tip in a down position so that the line will gravitate therefrom.

Another object of importance is to provide a tip as stated which will provide more efficient performance during regular fishing operations, so far as the reeling of the line is concerned, and so far as is concerned, further, the playing of the fish.

Another object of importance is to provide a tip as stated which will be so designed as to be capable of manufacture at low cost from light, noncorrosive materials, and can be embodied in otherwise conventional fishing rods with a minimum of difficulty and with, further, a minimum of modification or redesign of the rod construction.

Other objects will appear from the following description, the claims appended thereto, and from the annexed drawing, in which like reference characters designate like parts throughout the several views, and wherein:

Figure 1 is a fragmentary side elevational view of a fishing rod equipped with a tip formed according to the present invention;

Figure 2 is a top plan view;

Figure 3 is an enlarged, fragmentary sectional view on line 3—3 of Figure 2;

Figure 4 is a transverse sectional view, on the same scale as Figure 3, substantially on line 4—4 of Figure 3;

Figure 5 is a view similar to Figure 1 showing the line entangled about the rod; and Figure 6 is a view similar to Figure 1 showing the rod bent during the retrieving of a fish.

The reference numeral 10 generally designates a fishing rod, having a selected number of line guides 12, through which extends a line 14 having a sinker 16 or, alternatively, a lure or other device at its outer end.

The tip constituting the present invention has been generally designated at 18, and is formed as a one piece body of noncorrosive material, or, alternatively, of any material treated so as to have a smooth, noncorrosive surface. For example, a metallic body may be used, having a chrome plated surface, since a surface of this type not only resists corrosion, but also, provides a highly smooth facing for the tip preventing damage to the line and reducing to a minimum friction between the line and tip.

As shown in Figure 3, the body is of a tapered formation, tapering from its outer, free end, to its rod engaging inner end. At its inner end, the body is formed with an axial recess or socket 20, in which is embedded the tip end portion of rod 10. In this connection, the surface of the tip body merges smoothly into the material of the rod, for a purpose to be made presently apparent and additionally, as will be noted from Figure 3, the tapering of the tip body is along curving lines, with the tapered surface of the tip body being outwardly convexed as shown in Figure 3.

At its outer or larger end, the tip body is formed with a longitudinally and centrally disposed main channel 22, one end of which opens upon the outer end surface of the body, and the other end of which opens upon the top surface of the body, intermediate the opposite ends of the body. The channel 22 is inclined obliquely to the longitudinal center line of the tip body, at approximately 45 degrees to said longitudinal center line, as shown in Figure 3, and at its outer end, the channel 22 is flared and rounded off as at 24, to reduce to a minimum the friction between the line 14 and the wall of the channel, to assure smooth paying out or reeling in of the line. The top surface of the channel is designated at 26, and extends in approximate parallelism as shown in Figure 3 with the longitudinal center line of the tip body. At opposite sides of the channel, there are formed shallow side grooves 28, and these, as shown in Figure 2, converge in a direction toward the larger end of the tip body, extending into convergence at the inner end of the channel 22. The grooves 28 are each of them adapted to receive the line 14, during the playing of a fish as shown in Figure 6, or alternatively, the line may extend straight, midway between the grooves 28 as shown in Figure 2, into the channel 22. The fact that the side grooves diverge in the direction of the butt end of the rod, opening at their outer ends laterally of the rod (see Figure 2) facilitates the playing of the fish, as shown in Figure 6, since the line can shift from one to the other side of the rod without directly engaging the same, moving into one or the other of the channels 28. The portion of the body between the grooves 28 is formed as a gently, transversely rounded hump 30 the opposite sides of which merge smoothly into the inner side walls of the grooves. The grooves open upon the top surface of the body over their full lengths and hence the line can shift from one to the other groove over the hump as described.

In use of the device, ordinarily the line will extend straight through the channel 22 in the position thereof shown in Figures 1 and 2. No friction is offered at the entrance of the hole or passage 22, and the line can be cast or reeled in with danger of entanglement reduced to a minimum. In this connection, in a commercial embodiment, the underside of the body would be almost in parallelism with the longitudinal center line of the rod, while the top surface of the body would be at a more pronounced angle to the rod. This arrangement has been found to be particularly effective in insuring the smooth functioning of the device.

During the playing of a fish, the line can move into one or the other of the side channels 28 as shown in Figure 6, lying smoothly in the grooves 26 on either side of the tip to provide for a more efficient performance of the line in the tip, due to the absence of sharp edges on the tip.

Sometimes, the line may become wound about the end of the rod as shown in Figure 5. Usually, one must grasp the tip portion of the rod and manually unwind the tangled portion. In accordance with the present invention, however, one can grasp the line at any locations spaced from the tip, as for example, to the left of the line guide 12 in Figure 5, and by pulling to the left in Figure 5, that is, in a direction away from the tip, it will be found that the line will be pulled smoothly through the tip, and will pull the several convolutions of the tangled portion of the line off the rod, one after another, so that the wound portion of the line eventually falls off the tip, readying the rod for use once again. Or, alternatively, the rod can be held downwardly, and under these circumstances, again the convolutions tend to fall off the tip. The particular reason why this is so is believed to reside in the fact that the tip is in the shape of an elongated, tapering body, merging smoothly into the surface of the rod, and outwardly convexed over its full length as shown in the several figures of the drawing. Further, the expelling action is facilitated by the particular formation and relative arrangement of the passage 22 and grooves 28 relative to one another and to the shape of the tip body, reducing friction between the tip and line to a minimum and facilitating the pulling of the line for the purpose of shaking off the wound portions or convolutions.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A tip for a fishing rod comprising an elongated, tapering body having a recess in one end adapted to receive the fishing rod, said body being formed with a longitudinal passage communicating between the other end of the body and an intermediate portion of the body, and with side grooves extending into convergence at one end of said passage, said side grooves opening up the upper surface of said body over their full lengths, the portion of the body between the grooves being formed as a gently, transversely rounded hump merging at its opposite sides into the adjacent side walls of the grooves for free shifting of a line transversely of the body from one to the other side groove over said hump.

2. A tip for a fishing rod comprising an elongated, tapered body having an axial recess in its smaller end in which is adapted to be embedded the tip of a fishing rod, said body being formed with a longitudinal passage opening at one end upon the larger end of the body and at its other end upon the intermediate portion of the body, the body being additionally formed the side grooves extending into convergence at said other end of the passage, said side grooves opening upon the upper surface of said body over their full lengths, the portion of the body between the grooves being formed as a gently, transversely rounded hump merging at its opposite sides into the adjacent side walls of the grooves for free shifting of a line transversely of the body from one to the other side groove over said hump.

3. A tip for a fishing rod comprising an elongated, one piece, tapering body having an axial recess in its smaller end in which is adapted to be embedded one end of a fishing rod, said recess being so proportioned at its outer end as to cause the side surface of the body at the smaller end of the body to merge smoothly into the surface of the embedded rod, the body being formed with a longitudinally and centrally disposed passage opening at one end upon the outer end of the rod tip and opening at its other end upon the intermediate portion of the tip body, said passage being extended obliquely to the longitudinal center line of the tip, the tip body being additionally formed with convergent side grooves, said grooves extending into convergence at the other end of said passage, said side grooves opening upon the upper surface of said body over their full lengths, the portion of the body between the grooves being formed as a gently, transversely rounded hump merging at its opposite sides into the adjacent side walls of the grooves for free shifting of a line transversely of the body from one to the other side groove over said hump.

4. A tip for a fishing rod comprising an elongated, one piece, tapering body having an axial recess in its smaller end in which is adapted to be embedded one end of a fishing rod, said recess being so proportioned at its outer end as to cause the side surface of the body at the smaller end of the body to merge smoothly into the surface of the embedded rod, the body being formed with a longitudinally and centrally disposed passage opening at one end upon the outer end of the rod tip and opening at its other end upon the intermediate portion of the tip body, said passage being extended obliquely to the longitudinal center line of the tip, the tip body being additionally formed with convergent side grooves, said grooves extending into convergence at the other end of said passage, the side surface of the tip body being outwardly bulged along gradually curving lines from end to end of the tip body, said side grooves opening upon the upper surface of said body over their full lengths, the portion of the body between the grooves being formed as a gently, transversely rounded hump merging at its opposite sides into the adjacent side walls of the grooves for free shifting of a line transversely of the body from one to the other side groove over said hump.

5. A tip for a fishing rod comprising an elongated, tapering body having an axial recess in its smaller end adapted to receive the tip portion of a fishing rod, said body being formed with a longitudinal passage one end of which opens upon the larger end of the body and the other end of which opens upon the side of the body intermediate opposite ends of the body, said passage being extended obliquely to the longitudinal center line of the body and being flared in the direction of the larger end of the body, the body having a pair of side grooves having outer ends opening upon the respective sides of the body adjacent the smaller end of the body, said side grooves extending into convergence at the location of said other end of the passage, with the walls of the grooves merging smoothly into the wall of said passage, said side grooves opening upon the upper surface of said body over their full lengths, the portion of the body between the grooves being formed as a gently, transversely rounded hump merging at its opposite sides into the adjacent side walls of the grooves for free shifting of a line transversely of the body from one to the other side groove over said hump.

References Cited in the file of this patent

UNITED STATES PATENTS

| | | |
|---|---|---|
| 1,917,493 | Bretz | July 11, 1933 |
| 2,544,238 | Ritter | Mar. 6, 1951 |